(12) United States Patent
Kulkarni et al.

(10) Patent No.: US 8,911,535 B2
(45) Date of Patent: Dec. 16, 2014

(54) CARBON DIOXIDE REMOVAL PROCESS

(75) Inventors: Sudhir S. Kulkarni, Wilmington, DE (US); Edgar S. Sanders, Jr., Newark, DE (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 325 days.

(21) Appl. No.: 13/267,166

(22) Filed: Oct. 6, 2011

(65) Prior Publication Data

US 2012/0111051 A1  May 10, 2012

Related U.S. Application Data

(60) Provisional application No. 61/390,399, filed on Oct. 6, 2010.

(51) Int. Cl.
| | | |
|---|---|---|
| *B01D 53/22* | (2006.01) | |
| *F25J 3/06* | (2006.01) | |
| *F25J 3/08* | (2006.01) | |
| *B01D 71/64* | (2006.01) | |
| *C10L 3/10* | (2006.01) | |
| *F25J 3/02* | (2006.01) | |
| *B01D 53/14* | (2006.01) | |

(52) U.S. Cl.
CPC ........... *B01D 53/229* (2013.01); *F25J 2200/30* (2013.01); *F25J 3/0635* (2013.01); *F25J 3/067* (2013.01); *B01D 53/226* (2013.01);

(Continued)

(58) Field of Classification Search
USPC .......... 95/39, 45, 51; 96/4, 7, 9; 62/617, 618, 62/619, 620, 621, 928
See application file for complete search history.

(56) References Cited

U.S. PATENT DOCUMENTS

| 4,130,403 A | 12/1978 | Cooley et al. |
|---|---|---|
| 4,415,345 A | 11/1983 | Swallow |

(Continued)

FOREIGN PATENT DOCUMENTS

| DE | 4 325 513 | 12/1994 |
|---|---|---|
| EP | 0 596 470 | 5/1994 |

(Continued)

OTHER PUBLICATIONS

"Nitrogen Removal from Natural Gas—Phase II Draft Final Report," prepared by: Membrane Technology and Research, Inc., Dec. 22, 1999, pp. 1-44.

(Continued)

*Primary Examiner* — Jason M Greene
(74) *Attorney, Agent, or Firm* — Christopher J. Cronin

(57) ABSTRACT

A process for efficiently removing carbon dioxide from a hydrocarbon containing feed stream utilizing a membrane separation unit in conjunction with a heat exchanger and a carbon dioxide separation unit wherein the streams obtained in the carbon dioxide separation unit are utilized to provide the cooling effect in the heat exchanger.

21 Claims, 8 Drawing Sheets

Figure 3A:
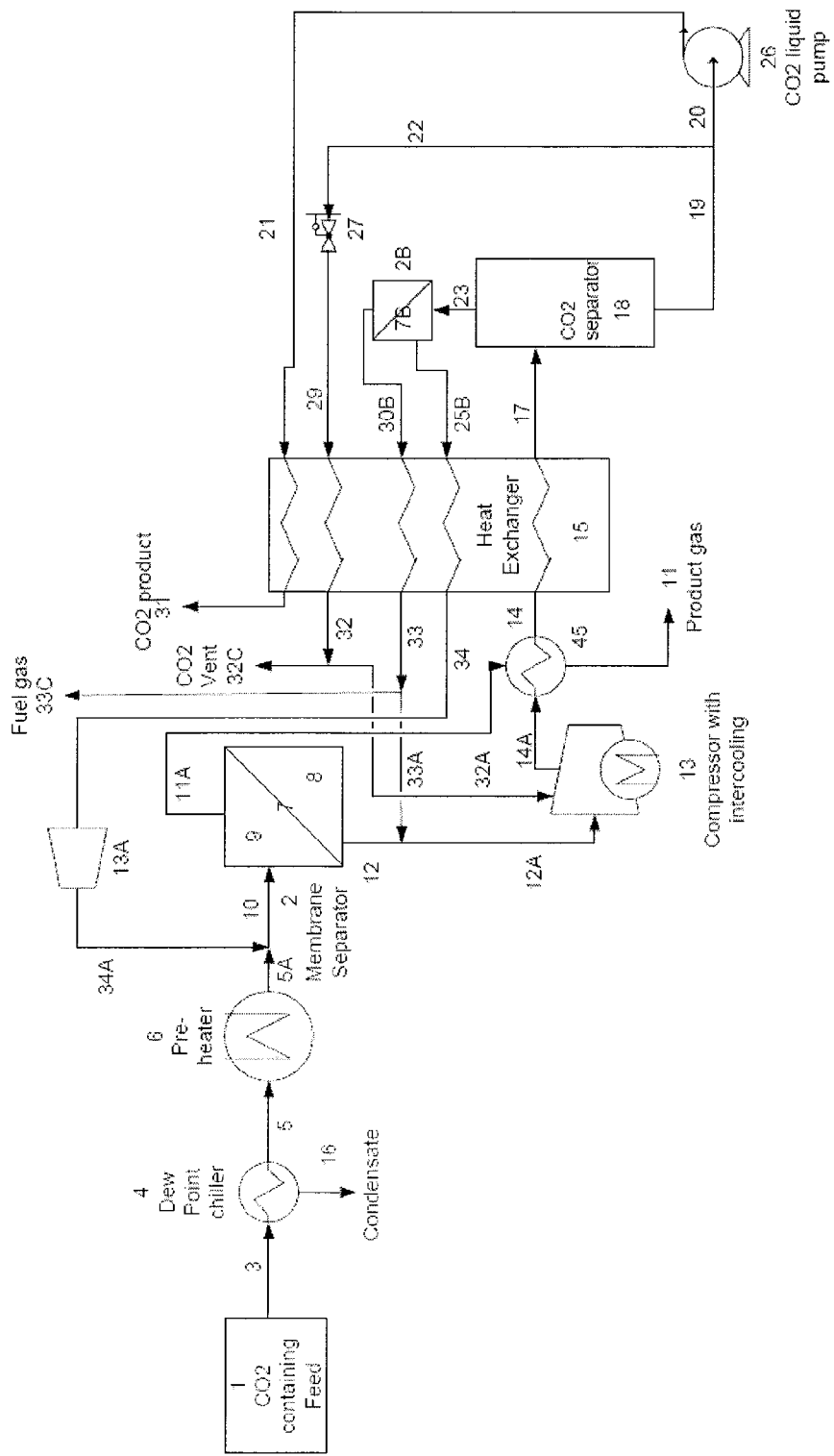

General scheme for membrane + heat exchanger + CO2 separator

(52) U.S. Cl.
CPC ............... B01D 71/64 (2013.01); C10L 3/104 (2013.01); F25J 2215/04 (2013.01); B01D 2311/2673 (2013.01); Y02E 50/346 (2013.01); B01D 2311/08 (2013.01); B10D 2311/06 (2013.01); F25J 3/0266 (2013.01); F25J 2245/02 (2013.01); B01D 2317/022 (2013.01); B01D 2257/504 (2013.01); F25J 3/0209 (2013.01); Y02C 10/12 (2013.01); B01D 2311/13 (2013.01); F25J 2205/40 (2013.01); F25J 3/0233 (2013.01); F25J 3/061 (2013.01); F25J 2220/82 (2013.01); B01D 2311/2669 (2013.01); F25J 2205/80 (2013.01); B01D 2311/25 (2013.01); F25J 2230/30 (2013.01); F25J 2210/04 (2013.01); B01D 2311/04 (2013.01); F25J 3/069 (2013.01); B01D 53/1475 (2013.01); Y02C 10/10 (2013.01); F25J 2205/04 (2013.01); B01D 2311/103 (2013.01); F25J 2235/80 (2013.01); F25J 2200/02 (2013.01); B01D 2311/106 (2013.01); F25J 3/029 (2013.01); Y10S 62/928 (2013.01)
USPC ............... 95/51; 96/4; 96/9; 62/617; 62/618; 62/619; 62/928

(56) References Cited

U.S. PATENT DOCUMENTS

| | | | |
|---|---|---|---|
| 4,441,900 A | 4/1984 | Swallow | |
| 4,639,257 A | 1/1987 | Duckett et al. | |
| 4,878,932 A | 11/1989 | Phade et al. | |
| 4,936,887 A | 6/1990 | Waldo et al. | |
| 5,015,270 A | 5/1991 | Ekiner et al. | |
| 5,085,676 A | 2/1992 | Ekiner et al. | |
| 5,233,837 A * | 8/1993 | Callahan | 95/51 |
| 5,647,227 A | 7/1997 | Lokhandwala | |
| 5,679,133 A | 10/1997 | Moll et al. | |
| 5,837,032 A | 11/1998 | Moll et al. | |
| 5,964,923 A | 10/1999 | Lokhandwala | |
| 7,018,445 B2 | 3/2006 | Simmons et al. | |
| 7,025,804 B2 | 4/2006 | Simmons et al. | |
| 2005/0092594 A1 | 5/2005 | Parro et al. | |
| 2007/0231244 A1* | 10/2007 | Shah et al. | 423/437.1 |
| 2009/0211733 A1 | 8/2009 | Tranier et al. | |

FOREIGN PATENT DOCUMENTS

| | | | |
|---|---|---|---|
| EP | 1 008 826 | 6/2000 | |
| FR | 2 917 982 | 1/2009 | |
| FR | 2 930 464 | 10/2009 | |
| FR | 2 930 465 | 10/2009 | |
| FR | 2 930 466 | 10/2009 | |
| JP | 10 059 705 | 3/1998 | |
| JP | 10-59705 | * 3/1998 | B01D 53/22 |
| WO | WO 2008 099291 | 8/2008 | |
| WO | WO 2009 007938 | 1/2009 | |

OTHER PUBLICATIONS

International Search Report and Written Opinion for PCT/US2011/055045, mailed Dec. 5, 2011.

* cited by examiner

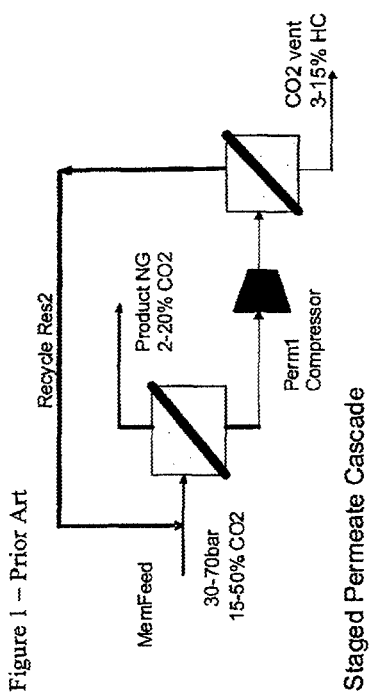

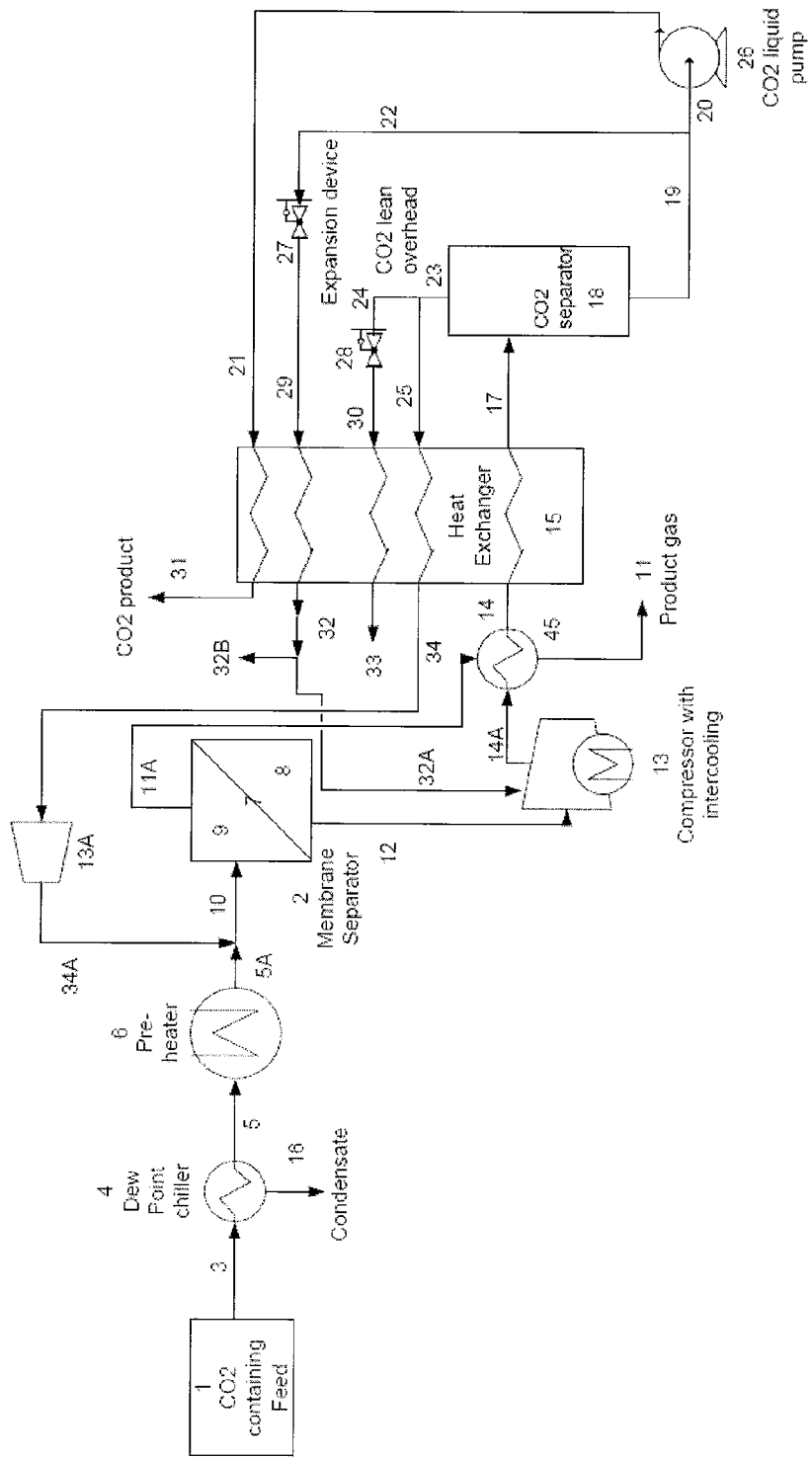
Fig 2A.   General scheme for membrane + heat exchanger + CO2 separator

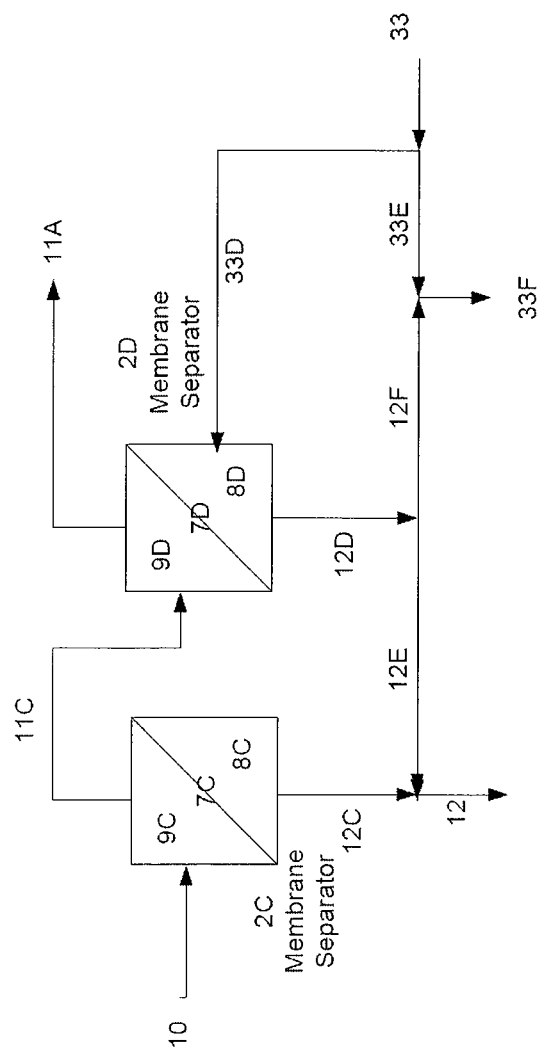
Fig 2B  Embodiment with sweep

General scheme for membrane + heat exchanger + CO2 separator + cold membrane on CO2 separator vent Scheme incorporating membrane CO2 separator Scheme with 2 V-L flash drums as CO2 separator Scheme with 2 V-L flash drums + distillation column as CO2 separator Scheme with 2 V-L flash drums + 2 distillation column as CO2 separator to produce a light end He enriched product

CARBON DIOXIDE REMOVAL PROCESS

CROSS-REFERENCE TO RELATED APPLICATIONS

This is a Non-Provisional of U.S. Provisional Patent Application No. 61/390,399 filed Oct. 6, 2010, entitled CARBON DIOXIDE REMOVAL PROCESS.

FIELD OF THE INVENTION

The present invention relates to a process for efficiently removing carbon dioxide from a hydrocarbon containing feed stream utilizing a membrane separation unit in conjunction with a heat exchanger and a carbon dioxide separation unit wherein the streams obtained in the carbon dioxide separation unit are utilized to provide the cooling effect in the heat exchanger.

BACKGROUND OF THE INVENTION

Membranes have been used to remove carbon dioxide and other acid/polar gases from natural gas. Membrane processes have been used to serve as a bulk cut separation of carbon dioxide. In such processes the carbon dioxide permeates through the membrane thereby giving rise to a carbon dioxide enriched permeate gas which is vented at low pressure and a hydrocarbon (HC) enriched product gas at high pressure. In addition, there are a variety of carbon dioxide removal processes utilizing two membranes stages. U.S. Pat. No. 4,130,403 provides a method for removing hydrogen sulfide and carbon dioxide from a natural gas by using acid-gas selective membranes. This two-stage process is taught for reducing HC losses. The rich carbon dioxide stream produced may be used in flooding processes for enhanced oil recovery. This staged permeate process is illustrated in FIG. 1.

Additional patents have disclosed the cryo-separation of carbon dioxide from hydrocarbons. In these cases, the membrane is used to increase the efficiency of the main cryogenic separation process. For this processing, all the feed gas has to be cooled to the cryo temperature. Two examples of these schemes are provided in French Patent Application 2917982 and U.S. Pat. No. 4,936,887. French Patent Application 2917982 provides for pretreating natural gas (I) having hydrocarbon, hydrogen sulfide and water that comprises (a) cooling (I) and introducing the cooled natural gas to a separation device (B1) to separate a liquid aqueous phase from (I); (b) contacting (I) with a liquid (11) rich in hydrogen sulfide to obtain a gas (6) that is free of water and an effluent liquid (4); (c) separating the gas, obtained in step (b), to obtain a permeate (8) rich in hydrogen sulfide and a retentate (7) free of hydrogen sulfide; and (d) partially condensing the permeate by cooling to obtain a liquid (10) rich in hydrogen sulfide, and a gas (12) that is free of hydrogen sulfide. Pretreating natural gas (I) having hydrocarbon, hydrogen sulfide and water, comprises (a) cooling (I) and introducing the cooled natural gas to a separation device (B1) to separate a liquid aqueous phase from (I); (b) contacting (I) with a liquid (11) rich in hydrogen sulfide, obtained in step (d), to obtain a gas (6) that is free of water and an effluent liquid (4) rich in water and hydrogen sulfide; (c) separating the gas, obtained in step (b), through a membrane (M) to obtain a permeate (8) rich in hydrogen sulfide and a retentate (7) free of hydrogen sulfide; and (d) partially condensing the permeate by cooling to obtain a liquid (10) rich in hydrogen sulfide, which is recycled to step (b), and a gas (12) that is free of hydrogen sulfide.

U.S. Pat. No. 4,936,887 provides a membrane separation incorporated into a distillation cycle for efficient recovery of carbon dioxide from a stream containing natural gas along with carbon dioxide. Methane and carbon dioxide are separated from a feed stream in a first distillation to produce a process stream containing essentially methane and carbon dioxide and which is substantially free to ethane and higher molecular weight hydrocarbons. The process stream consisting essentially of methane and carbon dioxide is subjected to further distillation to produce a carbon dioxide-rich product stream and a process stream enriched in methane. The methane-enriched process stream is then passed to a membrane separation unit for separating methane and carbon dioxide and for producing a high purity methane product stream.

U.S. Pat. No. 5,647,227 teaches a membrane separation process combined with a cryogenic separation process for treating a gas stream containing methane, nitrogen and at least one other component. The membrane separation process works by preferentially permeating methane and the other component and rejecting nitrogen. The process is particularly useful in removing components such as water, carbon dioxide or C3+ hydrocarbons that might otherwise freeze and plug the cryogenic equipment. In this scheme, the residue stream from the membrane is sent on to the cryogenic separator.

When the carbon dioxide permeate from the first membrane stage contains high hydrocarbon concentrations, these losses can be reduced by re-pressurizing the carbon dioxide permeate and feeding this repressurized carbon dioxide permeate to a second membrane stage. The carbon dioxide permeate from the second membrane stage is vented while the recovered hydrocarbon residue stream is often recycled to be added back to the original hydrocarbon feed methane containing feed gas. These two membrane stage processes have become increasingly important with regarding to the increasing value of the hydrocarbons. However, while the hydrocarbon losses are decreased by using such processes, there is an increase in the separation process costs. Furthermore, the carbon dioxide that is vented in such processes is typically obtained at low pressures so that additional high costs are incurred when the desire is to sequester the carbon dioxide or use it in enhanced oil recovery applications.

U.S. Pat. No. 4,639,257 discloses recovery of carbon dioxide from a gas mixture using a combination of membrane separation and distillation. The process teaches two embodiments. With regard to the preferred embodiment, the membrane separation preferably employs at least two stages with intermediate recompression. The final CO2 concentrated permeate is subjected to distillation to produce liquid CO2 with the required cooling provided by a separate vapor compression refrigeration unit. The process scheme is not integrated in terms of energy requirements making this uneconomical. In the second embodiment, membrane separation is only utilized on the overhead stream from the distillation column.

Accordingly, there is a need to provide a process which not only minimizes the loss of hydrocarbons but also allows for the efficient recovery of the carbon dioxide at high pressure.

SUMMARY OF THE INVENTION

The present invention provides a process for treating a hydrocarbon containing feed stream which minimizes the loss of hydrocarbons while at the same time allowing for the recovery of a high pressure carbon dioxide stream. The process involves utilizing a membrane separation unit in conjunction with a heat exchanger and a carbon dioxide separation unit. The various streams (carbon dioxide rich liquid stream and carbon dioxide lean overhead stream) isolated in the carbon dioxide separation unit are then used to provide the cooling effect in the heat exchanger and as fuel for the compressors utilized in the process.

DETAILED DESCRIPTION OF THE FIGURES

FIG. 1 provides a schematic of a prior art two-stage process for producing a carbon dioxide rich stream and reducing JHC losses.

FIG. 2A provides a schematic of the first embodiment of the process of the present invention.

FIG. 2B provides an alternative to the schematic of the process of FIG. 2A where a permeate sweep is employed.

FIG. 3A provides a schematic of the second embodiment of the process of the present invention.

Figure 3B:
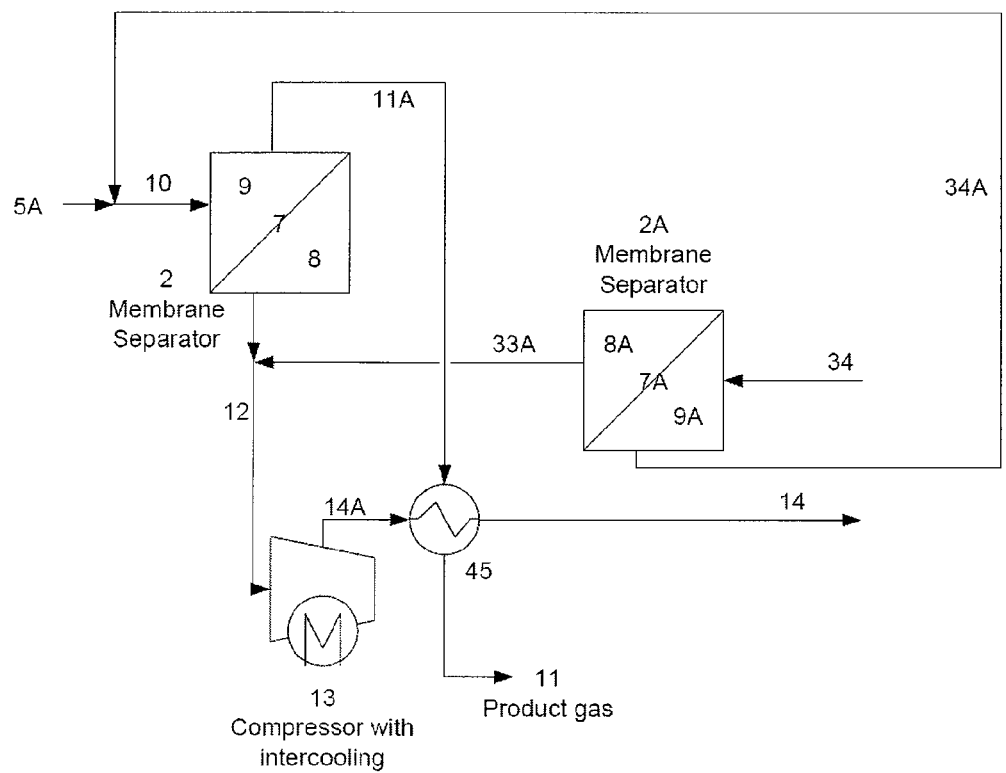

FIG. 3B provides an alternative to the schematic of the process of FIG. 3A.

Figure 4:
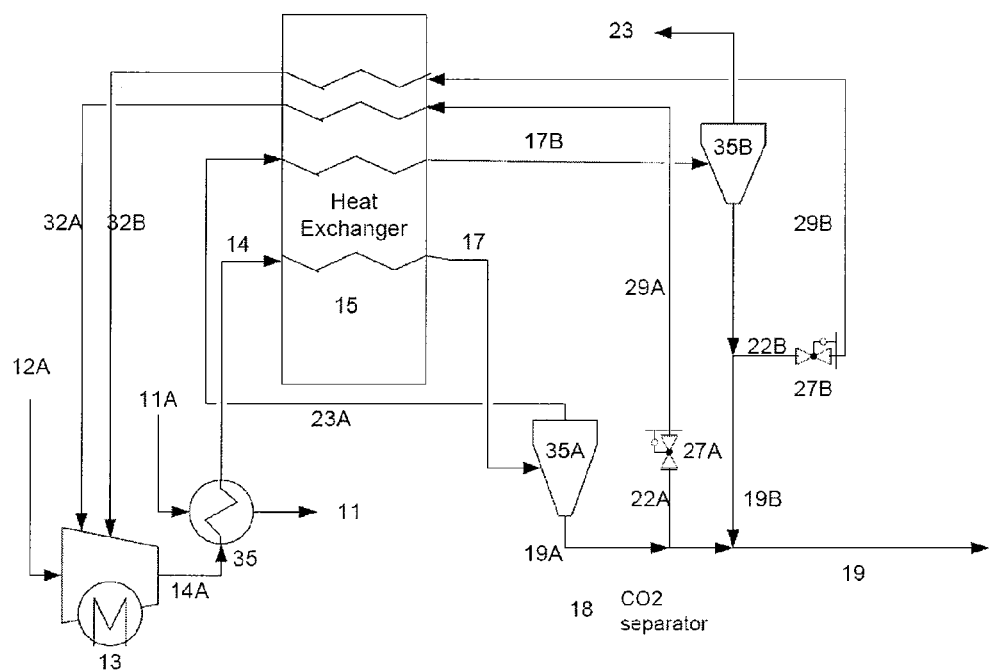

FIG. 4 provides a schematic of one embodiment of the carbon dioxide separation unit.

Figure 5:
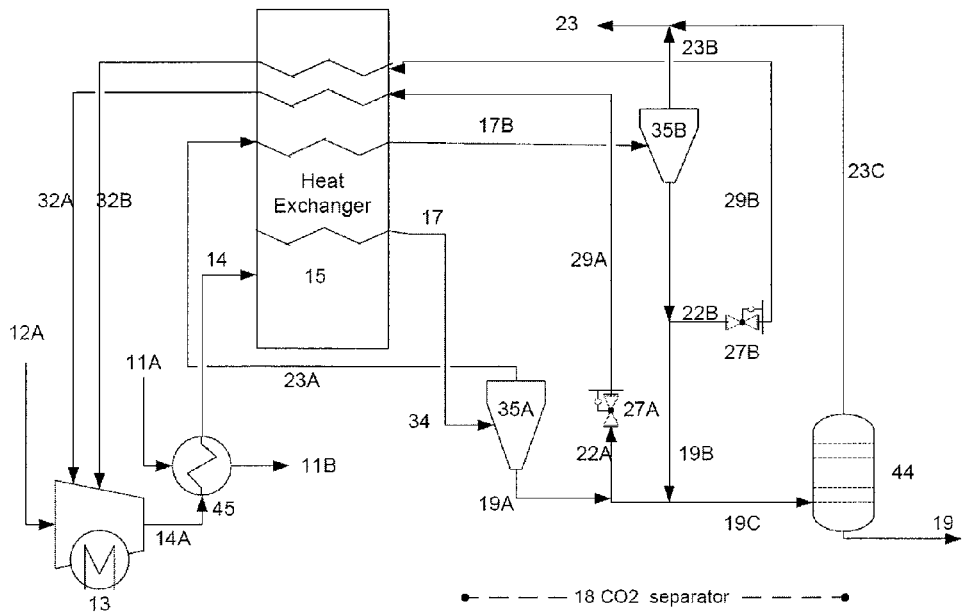

FIG. 5 provides a schematic of an additional embodiment of the carbon dioxide separation unit.

Figure 6:
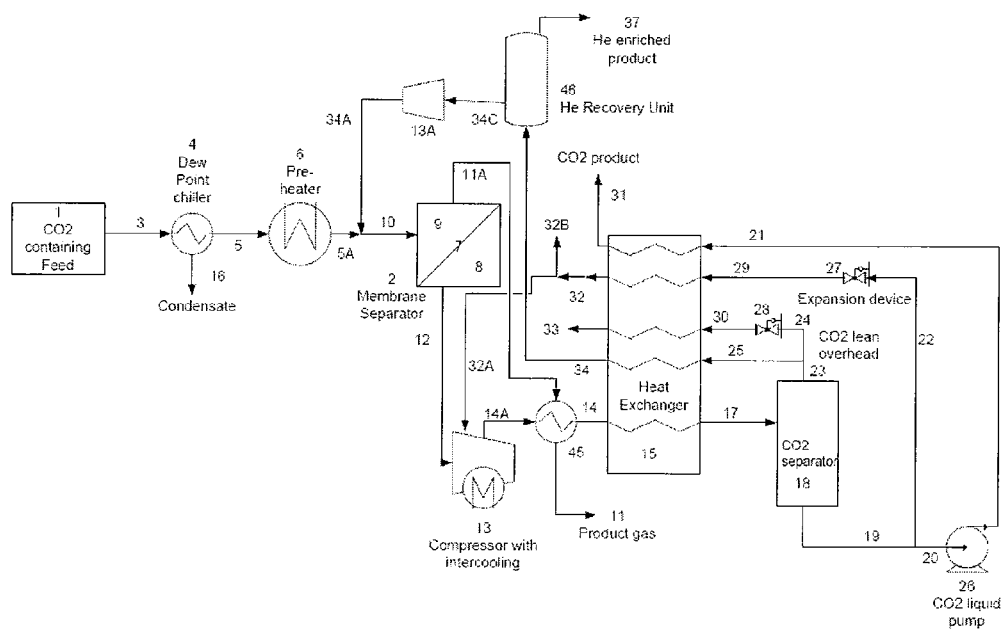

FIG. 6 provides a schematic of a still further embodiment of the carbon dioxide separation unit.

DETAILED DESCRIPTION OF THE INVENTION

By utilizing the process of the present invention, it is possible to minimize the hydrocarbon loss in the production of carbon dioxide, produce a carbon dioxide stream that is at a higher pressure than achieved when a membrane vent is utilized thereby enabling a more cost effective means of sequestration of carbon dioxide, provide a lower capital investment for recovering the carbon dioxide, and a lower operating cost for permeate compression compared to prior art two-stage membrane productions. Accordingly, the process of the present invention allows for recovery of carbon dioxide from a hydrocarbon feed stream in a cost effective and efficient manner.

The overall process of the present invention involves passing a hydrocarbon containing feed stream through a membrane separation unit that uses a carbon dioxide selective membrane, compressing the carbon dioxide rich permeate stream obtained and then cooling this stream using a heat exchanger, further isolating the carbon dioxide in a carbon dioxide separation unit to obtain a carbon dioxide rich liquid stream and a carbon dioxide lean overhead stream and then using each of these streams to provide the cooling effect in the heat exchanger. By utilizing this process, it is possible to recover/recuperate the heat often wasted in such processes and utilize this heat to promote the functioning of the heat exchanger.

The present process will be further described with reference to FIGS. 2 to 6 of the present invention as provided herein. These figures, while setting forth specific embodiments of the present process, are not meant to be limiting. There are two main embodiments of the present invention, each with a number of sub-embodiments. More specifically, the first embodiment of the present invention as set forth in FIG. 2A, provides for a process for recovering carbon dioxide from a hydrocarbon containing feed stream utilizing a membrane separation unit to form a first membrane stream and a second membrane stream; withdrawing the second membrane stream for further use; compressing the first membrane stream in a compressor followed by cooling in a heat exchanger; separating and purifying the compressed, cooled first membrane stream in a carbon dioxide separation unit to produce a carbon dioxide rich liquid stream and a carbon dioxide lean vapor stream; and then utilizing these two streams to provide the source of cooling in the heat exchanger for the compressed first membrane stream with these streams either being sent directly to the heat exchanger or as an option being split into two fractions with one of the fractions of each stream being subjected independently to expansion in order to provide further cooling as shown in FIG. 2A. This embodiment may be further altered as shown in FIG. 2B by splitting the membrane separator into two stages and using the expanded carbon dioxide lean overhead stream to provide a permeate sweep for the second membrane stage.

The second embodiment of the present invention, as set forth in FIG. 3A, provides for a process for recovering carbon dioxide from a hydrocarbon containing feed stream utilizing a primary membrane separation unit to form a first membrane stream and a second membrane stream; withdrawing the second membrane stream for further use; compressing the first membrane stream in a compressor followed by cooling in a heat exchanger; separating and purifying the compressed, cooled first membrane stream in a carbon dioxide separation unit to produce a carbon dioxide rich liquid stream and a carbon dioxide lean vapor stream; and then utilizing these two streams to provide the source of cooling in the heat exchanger for the compressed first membrane stream with the carbon dioxide rich liquid stream either being sent directly to the heat exchanger or as an option being split into two fractions with one of the fractions being subjected to expansion prior to being sent to the heat exchanger in order to provide further cooling and the carbon dioxide lean overhead stream being subjected to a cold secondary membrane separation unit to produce a cold residue stream and a cold permeate stream, each of these being sent to the heat exchanger. This embodiment may be further altered as shown in FIG. 3B by instead locating the secondary membrane separation unit to treat the warmed carbon dioxide lean vapor stream from the carbon dioxide separation unit after it has passed through the heat exchanger.

With regard to each of the above embodiments and alternatives, each of these embodiments and alternatives may include a variety of different carbon dioxide separations units. More specifically, the carbon dioxide separation units for each of the above embodiments and alternatives may be selected from carbon dioxide separation units that comprise: 1) one or more flash drums operated at gradually decreasing pressures/temperatures (see FIG. 4); 2) one or more flash drums operated at gradually decreasing pressures/temperatures in combination with a distillation column (see FIG. 5); 3) one or more distillation columns (not shown); or 4) one or more flash drums operated at gradually decreasing pressures/temperatures in combination with a first distillation column to treat the liquid product from the flash drums and a second distillation column to treat the carbon dioxide lean vapor streams to recover any helium that might be present (see FIG. 6). As a result, the present process can be carried out in the following combinations of equipment:

FIG. 2A: a membrane separation unit in combination with a compressor, heat exchanger, and a carbon dioxide separation unit that comprises one or more flash drums, one or more flash drums in combination with a distillation column, a distillation column alone or one or more flash drums in combination with two distillation columns;

FIG. 2B: a membrane separation unit in combination with a compressor, heat exchanger, and a carbon dioxide separation unit that comprises one or more flash drums, one or more flash drums in combination with a distillation column, a distillation column alone or one or more flash drums in combination with a two distillation columns, where the membrane separation unit is split into two stages and the expanded carbon dioxide lean overhead stream provides a permeate sweep for the second membrane stage.

FIG. 3A: a membrane separation unit in combination with a compressor, heat exchanger, and a carbon dioxide separation unit that comprises one or more flash drums, one or more flash drums in combination with a distillation column, a distillation column alone or one or more flash drums in combination with a two distillation columns and a cold membrane separation unit to further treat the carbon dioxide lean overhead stream before it is passed to the heat exchanger; and FIG. 3B: a membrane separation unit in combination with a compressor, heat exchanger, and a carbon dioxide separation unit that comprises one or more flash drums, one or more flash drums in combination with a distillation column, a distillation column alone or one or more flash drums in combination with two distillation columns and a second membrane separation unit to further treat the carbon dioxide lean overhead stream after it is passed to the heat exchanger.

With regard to the first embodiment of the present process, as depicted in FIG. 2A, the first step of the process of the present invention involves providing a high pressure hydrocarbon containing feed stream to be treated. With regard to the actual hydrocarbon containing feed stream utilized in all embodiments of the present process, this feed stream can be any hydrocarbon containing feed stream that is rich in methane and contains any one or more of the following components, hydrogen, carbon dioxide, nitrogen, helium, carbon monoxide, hydrogen sulfide, and higher hydrocarbons at pressure, preferably at least carbon dioxide. Those of ordinary skill in the art will recognize that the actual composition of the feed stream will depend upon the source of the feed stream. Accordingly, the present process is not meant to be limited by the actual composition of the hydrocarbon containing feed stream. As used herein, the use of the phrase "rich in methane" with regard to the hydrocarbon containing feeds stream refers to the hydrocarbon containing feed stream having at least 20% methane. Furthermore, as used herein, the phrase "higher hydrocarbons" refers to petroleum based compounds having two or more carbon atoms which form a hydrocarbon chain. Note that while these compounds may be substituted or unsubstituted, the majority of the components in the compound are carbon atoms with the minority (less than twenty-five percent of the compound) being made up of substituents of the type that are typically found in petroleum based compounds. These hydrocarbon containing feed streams can be obtained from a variety of different sources, including, but not limited to, sour natural gas, coal-bed methane, unconventional (shale or tight gas) sources, biogenic natural gas or landfill gas.

As used herein with regard to the present invention, the phrase "high pressure hydrocarbon containing feed stream" refers to a hydrocarbon containing feed stream that is at a pressure from about 125 psi to 1500 psi, preferably from about 150 psi to about 1400 psi. The pressure at which the hydrocarbon containing feed stream is introduced will often be determined by the process by which the hydrocarbon containing feed stream has already been subjected. More specifically, in certain instances such as geologic natural gas fields, the hydrocarbon containing feed stream will already be at high pressure. In those instances where the hydrocarbon containing feed stream is at less than what has been defined as "high pressure", it is possible to further compress the hydrocarbon containing feed stream utilizing one or more compressors (not shown) such as those known in the art to reach the desired pressure level. Such compression can be carried out utilizing any compressor that is known in the art.

The next step of the process of the present invention involves introducing the high pressure hydrocarbon containing feed stream into the membrane separation unit 2. Depending upon the source 1 of the high pressure feed stream, prior to the introduction of such feed stream into the membrane separation unit 2, it is often desirable to remove condensibles from the feed stream by introducing the feed stream via line 3 into a dew point chiller 4. By optionally using such dew point chillers 4, it is possible to remove a portion of the heavy hydrocarbons via line 16 found in the high pressure hydrocarbon containing feed stream before the feed stream is treated in the membrane separation unit 2. This is often desirable as such isolated heavy hydrocarbons are considered to be valuable. Dew point chillers 4 such as those contemplated for use in the present process are known in the art and include propane chillers or cooling water for the condensation and removal of the higher hydrocarbons. Such dew point chillers 4 typically operate around −30° C. The manner in which the dew point chillers 4 is operated are known to those skilled in the art.

Alternatively, a temperature swing adsorption (TSA) unit or a pressure swing adsorption (PSA) unit may be used to remove the condensibles from the feed stream.

Depending upon the degree of cooling achieved by the dew point chillers 4, it may also be desirable to pre-heat the high pressure hydrocarbon containing feed stream that has been processed in the dew point chiller 4 in order to obtain the optimal temperature for introducing the feed stream into a membrane separation unit 2. The optimal temperature for introducing the high pressure hydrocarbon containing feed stream into the membrane separation unit 2 will depend upon the type of membrane in place but will be above the liquefaction temperature of carbon dioxide. Preferably the temperature will range from about −45° C. to about 50° C., more preferably from about −30° C. to about 50° C. While lower temperatures are possible, in such cases there is a risk of having a high pressure hydrocarbon containing feed stream that includes condensate. Those of ordinary skill in the art will recognize that high pressure hydrocarbon containing feed streams including high levels of condensate may cause problems in a membrane separation unit 2. Accordingly, in addition to the dew point chiller 4, it may also be desirable to further treat the high pressure hydrocarbon containing feed stream by preheating the feed stream in a preheater 6 in order to achieve the about −45° C. to about 50° C. The high pressure hydrocarbon containing feed stream that was treated in the dew point chiller 4 is introduced into the preheater 6 via line 5. Such preheaters 6 and the conditions under which they are operated are known to those skilled in the art.

The membrane separation unit 2 utilized in the process of the present invention contains at least one membrane 7 that is selective for acid gases such as carbon dioxide and hydrogen sulfide over the other components in the hydrocarbon containing feed stream (the methane, higher hydrocarbons, nitrogen, etc.). The membrane is also selective for helium over the methane, higher hydrocarbons and nitrogen. With regard to each of the membranes 7 utilized in the present process, each membrane 7 has a permeate side 8 and a residue side 9. Since the membrane 7 is selective for acid gases such as carbon dioxide, it allows for the passing of carbon dioxide through the membrane 7 to the permeate side 8 of the membrane 7. While the membrane is selective for carbon dioxide, those skilled in the art will recognize that a minor portion of the other components in the high pressure hydrocarbon containing feed stream will also pass through the membrane 7 to become a part of the permeate. Accordingly, with regard to the present process, the permeate stream that is obtained will generally contain from about 40% to about 90% carbon dioxide with the remaining part of the permeate stream comprising the other components contained in the high pressure hydrocarbon containing feed stream. As a result of passing the high pressure hydrocarbon containing feed steam into the membrane separation unit 2 via line 10 and through the membrane 7, this stream is separated into two streams—one which is considered to be carbon dioxide rich and one which is considered to be carbon dioxide lean. For purposes of the present process, the stream that results from the portion of the high pressure hydrocarbon containing feed steam that permeates the membrane 7 and thereby forms a permeate stream is referred to as the first membrane stream. The remaining components which do not permeate the membrane 7 and which are retained on the residue side 9 of the membrane 7 are referred to as the second membrane stream. Those skilled in the art will recognize that while the membrane is selective for carbon dioxide, that some of the carbon dioxide in the high pressure hydrocarbon containing feed stream will also be retained as a portion of the residue stream (in the second membrane stream).

While a variety of different types of membranes 7 may be utilized in the membrane separation unit 2 of the process of the present invention, the preferred membrane 7 is a polymer membrane that is selective for acid gases such as a carbon dioxide over hydrocarbons. Such carbon dioxide selective membranes 7 may be made of any number of polymers that are suitable as membrane materials. With regard to the membranes of the present invention, this includes substituted or unsubstituted polymers selected from polysiloxane, polycarbonates, silicone-containing polycarbonates, brominated polycarbonates, polysulfones, polyether sulfones, sulfonated polysulfones, sulfonated polyether sulfones, polyimides and aryl polyimides, polyether imides, polyketones, polyether ketones, polyamides including aryl polyamides, poly(esteramide-diisocyanate), polyamide/imides, polyolefins such as polyethylene, polypropylene, polybutylene, poly-4-methyl pentene, polyacetylenes, polytrimethysilylpropyne, fluorinated polymers such as those formed from tetrafluoroethylene and perfluorodioxoles, poly(styrenes), including styrene-containing copolymers such as acrylonitrile-styrene copolymers, styrene-butadiene copolymers and styrene-vinylbenzylhalide copolymers, cellulosic polymers, such as cellulose acetate-butyrate, cellulose propionate, ethyl cellulose, methyl cellulose, cellulose triacetate, and nitrocellulose, polyethers, poly(arylene oxides) such as poly(phenylene oxide) and poly(xylene oxide), polyurethanes, polyesters (including polyarylates), such as poly(ethylene terephthalate), and poly(phenylene terephthalate), poly(alkyl methacrylates), poly(acrylates), polysulfides, polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ketones), poly(vinyl ethers), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates), polyallyls, poly(benzobenzimidazole), polyhydrazides, polyoxadiazoles, polytriazoles: poly(benzimidazole), polycarbodiimides, polyphosphazines, and interpolymers, including block interpolymers containing repeating units from the above such as terpolymers of acrylonitrile-vinyl bromide-sodium salt of para-sulfophenylmethallyl ethers, and grafts and blends containing any of the foregoing. The polymer suitable for use is intended to also encompass copolymers of two or more monomers utilized to obtain any of the homopolymers or copolymers named above. Typical substituents providing substituted polymers include halogens such as fluorine, chlorine and bromine, hydroxyl groups, lower alkyl groups, lower alkoxy groups, monocyclic aryl, lower acyl groups and the like.

With regard to one embodiment of the present invention, the preferred polymers include, but are not limited to, polysiloxane, polycarbonates, silicone-containing polycarbonates, brominated polycarbonates, polysulfones, polyether sulfones, sulfonated polysulfones, sulfonated polyether sulfones, polyimides, polyetherimides, polyketones, polyether ketones, polyamides, polyamide/imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate. An example of a preferred polyetherimide is Ultem 1000, P84 and P84-HT polymers, and Matrimid 5218.

Of the above noted polymeric membranes, the most preferred membranes 7 are those made of polyimides. More specifically, polyimides of the type disclosed in U.S. Pat. Nos. 7,018,445 and 7,025,804, each incorporated herein in their entirety by reference. With regard to these types of membranes, the process of the present invention preferably utilizes a membrane comprising a blend of at least one polymer of a Type 1 copolyimide and at least one polymer of a Type 2 copolyimide in which the Type 1 copolyimide comprises repeating units of formula I

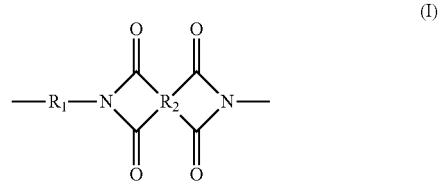

in which $R_2$ is a moiety having a composition selected from the group consisting of formula A, formula B, formula C and a mixture thereof,

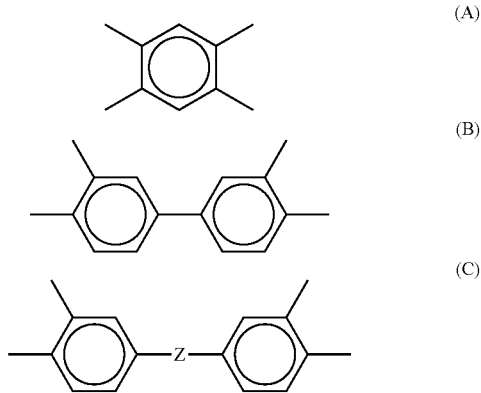

Z is a moiety having a composition selected from the group consisting of formula L, formula M, formula N and a mixture thereof; and

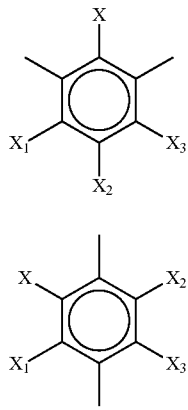

(L)

(M)

(N)

$R_1$ is a moiety having a composition selected from the group consisting of formula Q, formula S, formula T, and a mixture thereof,

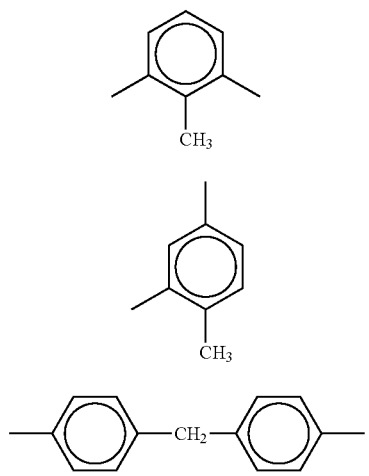

(Q)

(S)

(T)

in which the Type 2 copolyimide comprises the repeating units of formulas IIa and IIb

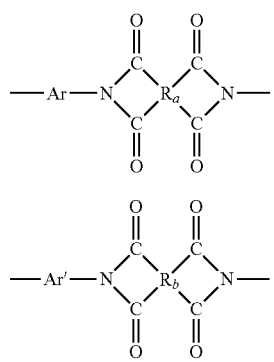

(IIa)

(IIb)

in which Ar is a moiety having a composition selected from the group consisting of formula U, formula V, and a mixture thereof, (U)

(V)

in which

X, $X_1$, $X_2$, $X_3$ independently are hydrogen or an alkyl group having 1 to 6 carbon atoms, provided that at least two of X, $X_1$, $X_2$, or $X_3$ on each of U and V are an alkyl group, Ar' is any aromatic moiety, $R_a$ and $R_b$ each independently have composition of formulas A, B, C, D or a mixture thereof, and

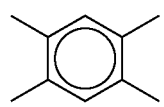

(A)

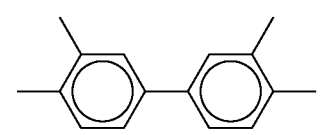

(B)

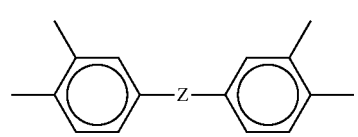

(C)

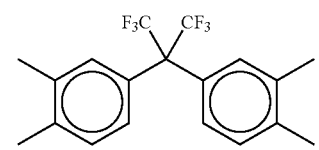

(D)

Z is a moiety having composition selected from the group consisting of formula L, formula M, formula N and a mixture thereof

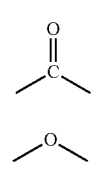

(L)

(M)

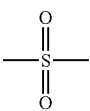

(N)

The material of the membrane consists essentially of the blend of these copolyimides. Provided that they do not significantly adversely affect the separation performance of the membrane, other components can be present in the blend such as, processing aids, chemical and thermal stabilizers and the like.

In a preferred embodiment, the repeating units of the Type 1 copolyimide have the composition of formula Ia.

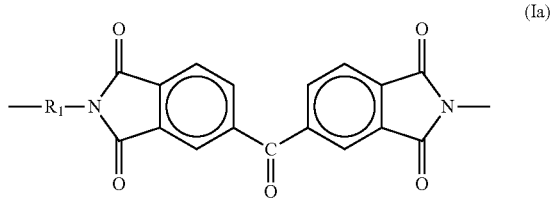

(Ia)

Wherein $R_1$ is as defined hereinbefore. A preferred polymer of this composition in which it is understood that $R_1$ is formula Q in about 16% of the repeating units, formula S in about 64% of the repeating units and formula T in about 20% of the repeating units is available from HP Polymer GmbH under the tradename P84

In another preferred embodiment, the Type 1 copolyimide comprises repeating units of formula Ib.

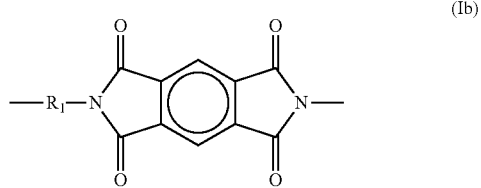

(Ib)

Wherein $R_1$ is as defined hereinbefore. Preference is given to using the Type 1 copolyimide of formula Ib in which $R_1$ is a composition of formula Q in about 1-99% of the repeating units, and of formula S in a complementary amount totaling 100% of the repeating units.

In yet another preferred embodiment, the Type 1 copolyimide is a copolymer comprising repeating units of both formula Ia and Ib in which units of formula Ib constitute about 1-99% of the total repeating units of formulas Ia and Ib. A polymer of this structure is available from HP Polymer GmbH under the tradename P84-HT325.

In the Type 2 polyimide, the repeating unit of formula IIa should be at least about 25%, and preferably at least about 50% of the total repeating units of formula IIa and formula IIb. Ar' can be the same as or different from Ar.

The polyimides utilized to form the membranes of the present process will typically have a weight average molecular weight within the range of about 23,000 to about 400,000 and preferably about 50,000 to about 280,000.

The blend of Type 1 and Type II copolyimides should be uniform and can be formed from the component copolyimides in conventional ways. For example, the Type 1 and Type 2 copolyimides can be synthesized separately and melt compounded or mixed in solution by dissolving each copolyimide in one or more suitable solvents. If the blend is solvent mixed, the solution can be stored or used directly in subsequent membrane fabrication steps or the solvent can be removed to provide a solid blend for later use. If the blend is prepared by melt compounding, the resulting blend can be dissolved in a suitable solvent for subsequent membrane fabrication. Uniformity of the dry (i.e., solvent-free) blend either before or after membrane formation can be checked by detecting only a single compositional dependent glass transition temperature lying between the glass transition temperatures of the constituent components. Differential scanning calorimetry and dynamic mechanical analysis can be used to measure glass transition temperature.

Preferably, the blend is formed by dissolving the Type 1 and Type 2 copolyimides in separate solutions, combining the solutions and agitating the combined solutions to obtain a dissolved blend. Mild heating to temperatures in the range of about 50 to 100° C. can optionally be used to accelerate dissolution of the components. The polyimide blend is sufficiently soluble in solvents typically used for processing into suitable gas separation membranes. The ratio of Type 1 copolyimide to Type 2 copolyimide in the blend is preferably greater than about 0.2, and more preferably at least about 1.0.

The polyimides described herein are made by methods well known in the art. Type 1 polyimides can conveniently be made by polycondensation of an appropriate diisocyanate with approximately an equimolar amount of an appropriate dianhydride. Alternatively, Type 1 polyimides can be made by polycondensation of equimolar amounts of a dianhydride and a diamine to form a polyamic acid followed by chemical or thermal dehydration to form the polyimide. The diisocyanates, diamines and dianhydrides useful for making the Type 1 copolyimides of interest are usually available commercially. Type 2 polyimides are typically prepared by the dianhydride/diamine reaction process just mentioned because the diamines are more readily available than the corresponding diisocyanates.

The preferred Type 1 and Type 2 polyimides are soluble in a wide range of common organic solvents including most amide solvents, that are typically used for the formation of polymeric membranes, such as N-methyl pyrrolidone ("NMP") and m-cresol. This is a great advantage for the ease of fabrication of industrially useful gas separation membranes.

The membranes 7 of the present invention can be fabricated into any membrane form by any appropriate conventional methods. To be economically practical, the separation membrane 7 usually comprises a very thin selective layer that forms part of a thicker structure. This may be, for example, an integral asymmetric membrane, comprising a dense skin region that forms the selective layer and a micro-porous support region. Such membranes 7 are described, for example, in U.S. Pat. No. 5,015,270 to Ekiner. As a further, and preferred, alternative, the membrane 7 may be a composite membrane 7, that is, a membrane 7 having multiple layers. Composite membranes 7 typically comprise a porous but non-selective support membrane 7, which provides mechanical strength, coated with a thin selective layer of another material that is primarily responsible for the separation properties. Typically, such a composite membrane 7 is made by solution-casting (or spinning in the case of hollow fibers) the support membrane 7, then solution-coating the selective layer in a separate step. Alternatively, hollow-fiber composite membranes 7 can be made by co-extrusion spinning of both the support material and the separating layer simultaneously as described in U.S. Pat. No. 5,085,676. The polyimide blends are utilized in the selectively permeable layer of the membrane 7 according to the present invention. The support layer of a composite membrane can be free of the copolyimide blend.

The membranes 7 of the invention can be fabricated into any membrane form by any appropriate conventional methods. For illustrative purposes, a method to prepare membranes in accordance with this invention is generally described as follows. Type 1 and Type 2 copolyimide compositions are selected and are combined in dry particulate form in a dry mix of desired proportion, e.g., 65% Type 1 and 35% Type 2. The solid polymer powder or flake is dissolved in a suitable solvent such as N-methylpyrrolidone at approximately 20-30% polymer content. The polymer blend solution is cast as a sheet at the desired thickness onto a flat support layer (for flat sheet membranes), or extruded through a conventional hollow fiber spinneret (for hollow fiber membranes). If a uniformly dense membrane is desired, the solvent is slowly removed by heating or other means of evaporation. If an asymmetric membrane is desired, the film or fiber structure is quenched in a liquid that is a non-solvent for the polymer and that is miscible with the solvent for the polyimide. Alternatively, if a composite membrane is desired, the polymer is cast or extruded over a porous support of another material in either flat film or hollow fiber form. The separating layer of the composite membrane can be a dense ultra-thin or asymmetric film.

The membrane separation unit 2 includes at least one of the above noted membranes 7. With regard to the actual configuration of the membrane separation unit 2, the membrane separation unit 2 can take on any number of configurations. In one embodiment, there is only one membrane 7 element in the membrane separation unit 2. In an alternative embodiment, the membrane separation unit 2 comprises a series of membrane elements 7 within a single membrane housing (not shown). With regard to this embodiment, the series of membranes 7 can be made up of membranes 7 of the same type selected from the membranes 7 detailed above or of two or more different membranes 7 selected from the membranes 7 detailed above. In a still further embodiment concerning the configuration of the membrane separation unit 2, the membrane separation unit 2 comprises two or more membrane housings with each of the housings having one or more membranes 7 as described hereinbefore. More specifically, in this embodiment, there can be two or more membrane housings, with each of the housings having either one membrane 7 or two or more membranes 7 of the same type or two or more membranes 7 of two of more different types. The resulting membranes 7 may be mounted in any convenient type of housing or vessel adapted to provide a supply of the hydrocarbon containing feed stream, and removal of the permeate stream and residue stream. The housing also provides a high-pressure side (for the hydrocarbon containing feed stream and the residue stream) and a low-pressure side of the membrane (for the permeate stream). For example, flat-sheet membranes can be stacked in plate-and-frame modules or wound in spiral-wound modules. Hollow-fiber membranes 7 are typically potted with a thermoset resin in cylindrical housings. The final membrane separation unit 2 comprises one or more membrane modules or housings, which may be housed individually in pressure vessels or multiple elements may be mounted together in a sealed housing of appropriate diameter and length.

As a result of treating the high pressure hydrocarbon containing feed stream in the membrane separation unit 2, two membrane streams result—a first membrane stream which is at a lower pressure (the carbon dioxide rich permeate stream) and a second membrane stream which is still at high pressure (the carbon dioxide lean residue stream). Note that with regard to the present discussion, the term membrane 7 is used in the singular but in practice, since the membrane separation unit 2 may contain multiple membranes 7, more than one residue and permeate stream may be obtained and combined to form the streams that will be further directed as noted.

The next step in the process of the present invention is the withdrawal of the second membrane stream from the residue side 9 of the membrane 7 of the membrane separation unit 2. Note that since the membrane 7 is selective for carbon dioxide, the residue stream (second membrane steam) typically contains a higher concentration of the remaining components in the second membrane stream. Once this residue stream is withdrawn from the membrane separation unit via line 11A/11, it is then directed for further use as this stream is considered valuable due to the higher concentration of higher hydrocarbons. In one alternative of the present invention, the residue stream is withdrawn and directly used as product (not shown in FIG. 2A). In another alternative embodiment as shown in FIG. 2A, the second membrane stream (the residue stream) may be directed via line 11A to a heat exchanger 45 where the final product is withdrawn via line 11.

The first membrane stream is withdrawn from the permeate side 8 of the membrane 7 of the membrane separation unit 2 and directed along line 12 where it will eventually be subjected to carbon dioxide separation. As the permeate crosses the carbon dioxide selective membrane (or membranes) 7 a pressure drop in the permeate obtained from the high pressure hydrocarbon containing feed stream is observed. More specifically, when the hydrocarbon containing feed stream is introduced into the membrane separation unit 2, it is introduced at a pressure from about 125 psi to 1500 psi. When the first membrane stream is withdrawn from the permeate side 8 of the membrane 7, it is withdrawn at a pressure from about 5 psi to about 300 psi. Accordingly, the next step in the process involves compressing and cooling the first membrane stream. With regard to the compression, the compression may be carried out utilizing one or more compressors 13. The compressors may be multistage devices with intercooling by air or water between stages. Utilizing these one or more compressors 13, it is possible to compress the first membrane stream which will typically be at from about 5 psi to about 300 psi to a specific pressure range, more specifically, from about 50 psi to about 550 psi, preferably from about 75 psi to about 450 psi.

After the first membrane stream is compressed in compressor 13, it is then directed along line 14/14A to a heat exchanger 15 in order to be cooled to a temperature ranging from about 5° C. to about −57° C., preferably from about −20° C. to about −50° C. in order to form a compressed, cooled, two phase (liquid and gas) first membrane stream. As used herein with regard to the process of the present invention, the phrase "heat exchanger" refers to a heat exchanger block which may comprise one or more heat exchangers. Accordingly, the one or more heat exchangers 15 may be any heat exchangers 15 that are known in the art that are a multi-stream heat exchangers 15. In the process of the present invention, the heat exchanger block can comprise either one multi-stream heat exchanger 15 or two or more multi-stream heat exchangers 15 that are arranged and used in a series. Furthermore, as used herein, the phrase "multi-stream heat exchanger" refers to a heat exchanger 15 that has two or more zones which allow for the passage of various streams through the heat exchanger 15 (streams from different sources or the same source). With regard to the present multi-stream heat exchanger 15 to be used in the process of the present invention, while being able to have any number of heat exchanger zones, preferably the heat exchanger has 2 to 5 zones. The cooling may be performed by one or more multi-stream heat exchangers 15. The heat exchanger 15 may be any conventional heat exchanger 15, such as a plate fin, shell-in-tube, spiral wound, or brazed aluminum plate heat exchanger 15, or it may be a falling film evaporator as disclosed in EP Patent 1008826, a heat exchanger 15 derived from an automobile radiator as disclosed in pending U.S. Patent Application No. 2009/211733, or plate heat exchangers manufactured as disclosed in pending French Patent Application No. 2,930,464, French Patent Application No. 2,930,465 and French Patent Application No. 2,930,466, and combinations thereof. The noted patents regarding the heat exchangers 15 are all incorporated herein by reference in their entireties.

More specifically, the cooling of the first membrane stream within the heat exchanger 15 is accomplished through utilization of the latent heat of the carbon dioxide rich liquid stream, the sensible heat of the expansion of a portion of the carbon dioxide lean vapor stream, the sensible heat of at least a portion of the carbon dioxide lean vapor stream without prior expansion, the sensible heat of a fully expanded and vaporized portion of the carbon dioxide rich liquid stream; and/or the latent and sensible heat of a partially expanded and vaporized portion of the carbon dioxide rich liquid stream. Of the various streams (the carbon dioxide rich stream provides cooling by expansion and evaporation and the carbon dioxide lean vapor stream provides cooling by expansion) obtained in the carbon dioxide separation unit 18 as will be described herein below.

During the carbon dioxide separation process step, a carbon dioxide rich liquid stream (via line 19) and a carbon dioxide lean overhead stream (via line 23) are obtained. The degree of refrigeration required for cooling the carbon dioxide in the first membrane stream to obtain the two phase stream 17 is obtained by utilizing the carbon dioxide rich liquid stream and the carbon dioxide lean overhead stream in two manners. First, as shown in FIG. 2A, the heat exchanger operates in a heat-economizing mode with each of the product streams from the carbon dioxide separation unit 18 being passed to the heat exchanger 15. This is shown via lines 19, 20 and 21 with the aid of a pump 26 for the carbon dioxide rich liquid stream and via lines 23 and 25 for the carbon dioxide lean overhead stream. Second, as additional cooling is needed, a fraction of each of the streams can be split off and can be subjected to partial expansion and/or evaporation of the process streams (via lines 19, 22 and 29 with the aid of one or more expansion devices 27 for the carbon dioxide rich liquid stream and via lines 23, 24 and 30 with the aid of one or more expansion devices 28 for the carbon dioxide lean overhead stream). Expansion and evaporation may be performed on a fraction of the carbon dioxide rich liquid stream by one or more pressure reduction devices 27. The expansion may be performed by any pressure reduction device including but not limited to conventional cold turbo-expanders, Joule-Thomson valves, reciprocating expansion engines, centrifugal or axial flow turbines, etc., and any combinations thereof. One of ordinary skill in the art will be capable of optimizing the number of pressure reduction devices for the desired thermodynamic outcome—in this case, a liquid first membrane stream which is enriched with carbon dioxide. The degree of refrigeration required for cooling the first membrane stream can also be obtained by expansion of a fraction of the carbon dioxide lean overhead stream by one or more pressure reduction devices 28 as described with regard to the carbon dioxide rich liquid stream.

In a still further alternative to the present process, the compressed first membrane stream may be further cooled prior to its introduction into the heat exchanger 15 by using a heat exchanger 45. In this embodiment, additional pre-cooling of the compressed first membrane stream of line 14A can be obtained by heat exchange with the second membrane stream 11A which is directed to the heat exchanger 45 before being pulled off as product. Note that the streams of lines 12 and 11A are typically cooler than the incoming hydrocarbon containing feed stream of line 10 because of Joule-Thomson cooling associated with the pressure drop from feed stream to permeate side in the membrane 7. As a result, the carbon dioxide rich stream which is the cooled, compressed first membrane stream is routed to the heat exchanger 15 via line 14, while the product gas stream which is at a warmer temperature is withdrawn via line 11.

As noted, the cooling of the compressed, first membrane stream is carried out utilizing the streams produced in the carbon dioxide separation unit 18. Accordingly, the first membrane stream that is a compressed, cooled, two-phase stream from the heat exchanger 15 is then separated and purified in the carbon dioxide separation unit 18 to produce the two streams utilized to cool the first membrane stream in the heat exchanger 15. The cooled, compressed, first membrane stream is fed to the carbon dioxide separation unit 18 via line 17. The objective of the carbon dioxide separation unit 18 is to separate and purify the carbon dioxide from the stream 17 and to then utilize the streams obtained (the carbon dioxide rich liquid streams and the carbon dioxide lean overhead streams) to provide cooling in the multi-stream heat exchanger 15 by running these streams back through the heat exchanger 15 to capture the energy released from the streams. This separation and purification in the carbon dioxide separation unit 18 is accomplished through multiple or single step partial condensation and/or distillation steps. These multiple or single step partial condensation and/or distillation steps can be carried out in one of a number of manners: 1) by using one or more flash drums 35 operated at gradually decreasing pressures/temperatures (see FIG. 4); 2) by using one or more flash drums 35 operated at gradually decreasing pressures/temperatures in combination with a distillation column 44 to treat the flash drum bottoms (see FIG. 5); 3) by using one or more distillation columns 44 alone (not shown) and 4) by using one or more flash drums 35 operated at gradually decreasing pressures/temperatures in combination with two distillation columns—one 44 for the treating the flash drum bottoms and one 46 for treating the carbon dioxide lean overhead stream after it exits the heat exchanger 15 (see FIG. 6). The result in each of these embodiments is to produce a carbon dioxide rich liquid stream which is pumped back to the heat exchanger 15 via lines 19, 20, 21, 22 and 29 and a carbon dioxide lean vapor stream which is taken off as an overhead stream via lines 23, 24, 25 and 30 and recycled back to the heat exchanger 15 or the membrane separation unit 2.

As a result of the above steps, the cold energy from the carbon dioxide rich liquid streams and the carbon dioxide lean vapor streams is transferred and utilized to cool the incoming cooled, compressed, first membrane stream to the level necessary to achieve a two phase (liquid/gas) stream.

Note that the pressure of the carbon dioxide rich liquid recycled to the heat exchanger 15 can be fixed by sequestration or re-injection requirements. Also with regard to the heat exchanger 15, a defrosting step may occasionally be utilized to remove any condensation and/or crystallization products from the heat exchanger 15 whenever pressure drop or heat transfer limitations become uneconomical and/or inefficient. During the defrosting step, the first membrane stream which is rich in carbon dioxide flows through the heat exchanger at a temperature ranging from approximately 0° C. to approximately 40° C. This stream is warmer than the temperature at which the first membrane stream is normally treated in the carbon dioxide separation unit 18 and accordingly is removed prior to reaching the carbon dioxide separation step.

The first embodiment for the carbon dioxide separation unit 18 is set forth in FIG. 4, one or more flash drums 35A and 35B (also commonly referred to as vapor-liquid separators) are operated at gradually decreasing temperatures/pressures to obtain carbon dioxide rich liquid stream 19 and a carbon dioxide lean overhead stream 23 which will then be used to provide cooling in the multi-stream heat exchanger 15. The cooled, compressed first membrane stream which is at a temperature from about −25 to about −55° C. will be introduced into the first flash drum 35A where it will be separated into the carbon dioxide rich liquid stream 19A and the carbon dioxide lean vapor stream 23A. More specifically, a fraction of the carbon dioxide rich liquid stream 19A obtained as a result of the first flash drum 35A of the carbon dioxide separation unit 18 is withdrawn as a carbon dioxide product stream via lines 19A and 19. The remaining portion of stream 19A is recycled to the heat exchanger via lines 22A, and 29A through expansion device 27A which allows for further cooling of the carbon dioxide rich stream before it is introduced into the heat exchanger 15 via line 29A. In this particular alternative, once the carbon dioxide rich stream is passed through the heat exchanger 15, it is it recycled to the compressor 13 via line 32A to be combined into stream 14A.

The carbon dioxide lean overhead stream 23A obtained from the first flash drum 35A of the carbon dioxide separation unit 18 is recycled to the heat exchanger 15 and further cooled to a typical temperature range of about −45° to about −55° C. This stream 17B is then sent to the second flash drum 35B to produce a second carbon dioxide rich liquid stream and a second carbon dioxide lean vapor stream. As with the first carbon dioxide rich liquid stream, this second carbon dioxide rich liquid stream may be withdrawn as a carbon dioxide product stream via lines 19B and 19 with the remaining portion of the faction begin recycled to the heat exchanger via lines 22B, and 29B through expansion device 27B which allows for further cooling of the carbon dioxide rich stream before it is introduced into the heat exchanger 15 via line 29B. In this particular alternative, once the carbon dioxide rich stream is passed through the heat exchanger 15, it is it recycled to the compressor 13 via line 32B to be combined into stream 14A. As shown in FIG. 2A, the carbon dioxide lean overhead stream 23 from the second flash drum 35B (or the last flash drum in the series when more than two flash drums are utilized), can be recycled via lines 23, 25 and 34 to the membrane separation unit 2 or passed through an expansion device via lines 23, 24 and 30 and further used as a fuel gas in the process of the present invention or in some other process that requires a fuel gas. In those instances where the stream is recycled to the membrane separation unit 2, it may be necessary to increase the pressure in the stream prior to adding it to the hydrocarbon containing feed stream. Accordingly, a second compressor 13A which is a standard booster compressor such as those known in the art may be utilized along line 34/34A to achieve the desired pressure.

As illustrated in FIG. 5, a distillation column 44 is utilized in addition to the flash drums 35A and 35B to obtain a more purified carbon dioxide liquid stream and a carbon dioxide lean overhead stream than can be obtained by flash drums 35A and 35B alone. The distillation column 44 may be of tray or packed design. Preferably, the distillation column 44 is a stripping column where the bottom product is highly carbon dioxide enriched. The column 44 overhead is passed along line 23C through the heat exchanger 15 in the same manner as noted with regard to line 23 of FIG. 2A and then recycled back to the hydrocarbon containing feed stream. The streams 19A, 19B and 19C and 23A, 23B and 23C are each are further processed in the same manner as shown for streams 19 and 23 in FIG. 2A.

Note that while FIG. 5 shows a configuration with two flash drums 35A and 35B in combination with one distillation column 44, it is also possible to use one or more distillation columns 44 alone. In this case the compressed and cold permeate stream is fed directly to the distillation column to produce a carbon dioxide rich liquid stream and a carbon dioxide lean vapor stream which are then processed in the same manner as noted with regard to the carbon dioxide rich liquid streams and the carbon dioxide lean vapor streams of FIGS. 3 and 5.

The remaining embodiment with regard to the carbon dioxide separation unit 18 is depicted in FIG. 6. This embodiment differs from FIG. 5 in that the carbon dioxide lean vapor stream 23/25 may be passed through a second distillation column 46 (an overhead distillation column) in order to remove any helium present prior to the stream being compressed in compressor 13A and added back via line 34A to the hydrocarbon containing feed stream 10 to be introduced into the membrane separation unit 2. This distillation column may also be of the tray or packed bed design.

In an alternative to FIG. 2A, including the various embodiments of the carbon dioxide separation unit 18 as described hereinbefore, the process may include a further membrane separation unit 2D in which the warm carbon dioxide lean overhead stream (the carbon dioxide lean overhead stream that has passed through the heat exchanger) may be used to sweep the permeate side 8D of this further membrane separation unit 2D as shown in FIG. 2B. With regard to this embodiment, the residue stream 9C from the first membrane separation unit 2C is removed from the residue side 9C of the membrane 7C and then passed via line 11C into the further membrane separation unit 2D. The warm carbon dioxide lean overhead stream is removed from the heat exchanger via line 33 in FIG. 2A and is used to sweep the permeate side 8D of the membrane 7D of the second membrane separation unit 2D. The embodiment shown in FIG. 2B is particularly useful when the acid gas concentration of the product hydrocarbon in the second membrane stream—the residue stream (stream 11A/11) is to be reduced to low levels (typically less than 3% mole fraction). With regard to FIG. 2B, the primary membrane separation unit (depicted as 2C in FIG. 2B) is arranged in a split configuration where membrane 2C is operated conventionally and the membrane 7D of the membrane separation unit 2D is operated with a permeate sweep stream 33D. A fraction of the stream 33D or all of the reduced pressure overhead stream 33 is directed towards sweeping the permeate side 8D of membrane 7D. Preferably the sweep in membrane 7D is operated in counter-current mode with the sweep gas 33D entering the membrane separation unit 2D on the same side of space 8D as the exit stream 11A leaving side 9D. The permeate stream 12D can combined with permeate stream 12C to form stream 12 which is then processed further as shown in FIG. 2A. In this configuration, the carbon dioxide capture as product gas will be increased. Stream 33D will be a smaller fraction of stream 33 so as to not over-dilute the carbon dioxide concentration in stream 12. Alternatively, stream 12D can be combined with stream 33E (the fraction of stream 33 not used for the sweep) and used elsewhere as a fuel gas. In this configuration stream 33D will be either all or a large fraction of stream 33. This stream, as shown in FIG. 2B, is fractionated and a portion of the stream is withdrawn via lines 33E and 33F to be used as a fuel gas in the present process (to fuel the compressor 13 or 13A) or to be used as fuel in other processes.

A still further embodiment of the process of the present invention is set forth in FIG. 3A. This embodiment differs from FIG. 2A in that rather than pass the carbon dioxide lean overhead stream from line 23 either directly to the heat exchanger or to also pass a fraction through an expansion device, the carbon dioxide lean overhead stream from line 23 is passed directly to a cold membrane separation unit 2B where it is processed before being passed through the heat exchanger 15. As noted above, with regard to the present embodiment, the carbon dioxide separation unit 18 may be in any of the configurations noted hereinbefore (one or more flash drums, one or more flash drums with one or more distillation columns, one or more distillation columns). In addition, this embodiment may also be utilized in conjunction with the further membrane separation unit as depicted in FIG. 2B. The secondary membrane separation unit utilized may be the same in configuration as described with regard to the membrane separation unit 2 of FIG. 2A. In addition, the same types of membranes as described hereinbefore with regard to the embodiment of FIG. 2A may be utilized in the present process. More specifically, while the configurations and membranes may differ, in the preferred process, at least the membranes are the same. In an even further embodiment, the membranes and the configuration of the membranes are the same as with regard to the membrane separation unit 2 of FIG. 2A. In the preferred embodiment of the present invention, the secondary selective membrane 7B is a polyimide membrane. By utilizing this secondary membrane 7B, it is possible to obtain a carbon dioxide enriched secondary membrane stream 30B from the permeate side 8B of the secondary carbon dioxide selective membrane 7B and a carbon dioxide depleted secondary membrane stream 25B from the residue side 9B of the secondary membrane 7B. Stream 25B is warmed through the heat exchanger 15 to form stream 34 while stream 30B is similarly warmed to form stream 33. The pressure of stream 34 may be boosted by an optional compressor 13A and combined to form the feed 10 to the primary membrane separation unit 2. The secondary permeate stream 33 may be recycled to be combined with permeate stream 12 from membrane separation unit 2 and forms the feed to compressor 13 or optionally withdrawn and utilized as a fuel gas.

A further embodiment of the process of the present invention is set forth in FIG. 3B. This embodiment differs from FIG. 3A in that rather than pass the lean overhead stream 23 to the secondary cold membrane, instead the warmed overhead stream 34 of FIG. 2A is sent to the secondary membrane separator 2A. The carbon dioxide depleted residue stream 34A from the residue side 9A of the secondary carbon dioxide selective membrane 7A is sent (via the optional compressor 13A) to be combined to form the feed 10 to the primary membrane separator 2. The CO2 enhanced permeate stream 33A may be recycled to be combined with permeate stream 12 from membrane separation unit 2 and forms the feed to compressor 13 or optionally withdrawn and utilized as a fuel gas.

Those of ordinary skill in the art will recognize that the process of the present invention can be utilized as it is presented herein or it may be utilized as a portion of a broader process application. More specifically, the process of the present invention can be coupled with EOR, sequestration, pipeline applications, or other processes that require the production of a carbon dioxide product.

ELEMENTS OF THE FIGURES

1—source of hydrocarbon containing feed stream
2—primary membrane separation unit
2A—warm secondary membrane separation unit
2B—cold secondary membrane separation unit
2C—first primary split membrane separation unit
2D—second primary split membrane separation unit
3—line by which the hydrocarbon containing feed stream is fed to the dew point chiller
4—dew point chiller
5—line by which the chilled hydrocarbon containing feed stream is fed to the preheater
6—preheater
7—membrane (7B, 7C, 7D)
8—permeate side of membrane (8D)
9—residue side of the membrane ((C)
10—line by which the preheated hydrocarbon containing feed stream is fed to the membrane separation unit
11—line by which the second membrane stream is withdrawn (11A, 11C)
12—line by which the first membrane stream is fed to the compressor
13—compressor
13A—second compressor
14—line by which the compressed first membrane stream is fed to the heat exchanger (14A)
15—heat exchanger
16—line by which the condensate is withdrawn from the dew point chiller
17—line by which the compressed, cooled first membrane steam is fed to the carbon dioxide separation unit (17B)
18—carbon dioxide separation unit
19—line by which the carbon dioxide rich liquid stream exits the carbon dioxide separation unit (19A, 19B)
20—split line from line 19 by which the carbon dioxide rich liquid stream enters the carbon dioxide liquid pump
21—line which feeds the carbon dioxide rich liquid stream from the carbon dioxide liquid pump to the heat exchanger
22—split line from line 19 which includes a first expansion valve to expand the carbon dioxide rich liquid stream before it is fed via line 29 to the heat exchanger (22A, 22B)
23—line by which the carbon dioxide overhead stream exits the carbon dioxide separation unit (23A, 23B, 23C)
24—split line from line 23 which includes a second expansion valve to expand the carbon dioxide lean stream before it is fed via line 30 to the heat exchanger
25—split line from line 23 which feeds the carbon dioxide lean stream to the heat exchanger
26—carbon dioxide liquid pump
27—first expansion valve (27A, 27B)
28—second expansion valve
29—line which feeds the expanded carbon dioxide liquid stream to the heat exchanger (29A, 29B)
30—line which feeds the expanded carbon dioxide lean overhead stream to the heat exchanger (30B)
31—line by which the highly purified carbon dioxide product stream is withdrawn
32—line by which the low pressure highly purified carbon dioxide product stream is withdrawn (from expansion valve) from the heat exchanger and either withdrawn as product 32B or recycled to the compressor 32A 33—line by which the low pressure carbon dioxide lean overhead stream is withdrawn (from expansion valve) from the heat exchanger (33D, 33E, 33F)
34—line by which the carbon dioxide lean overhead stream is recycled to be added to the hydrocarbon containing feed stream to be treated in the membrane separation unit
35—flash drum(s) (35A, 35B)
36—second carbon dioxide liquid pump
37—line by which carbon dioxide rich liquid leaves the flash drum
38—line by which the carbon dioxide lean overhead leaves the flash drum
39—secondary carbon dioxide selective membrane
40—secondary residue side
41—secondary permeate side
42—line to withdrawn secondary permeate stream
43—line to withdraw secondary residue stream
44—distillation column
45—one pass heat exchanger
46—second distillation column

What is claimed is:

1. A process for recovering carbon dioxide from a pressurized hydrocarbon containing feed stream, the process comprising the steps of:
   a) introducing a high pressure hydrocarbon containing feed stream that comprises at least methane and carbon dioxide into a first membrane separation unit at a temperature that is above the liquefaction temperature of carbon dioxide, the first membrane separation unit containing one or more membranes that are selective for carbon dioxide over the other components in the hydrocarbon containing feed stream, each membrane having a permeate side and a residue side and allowing for the passing of carbon dioxide to the permeate side to form a first membrane stream on the permeate side of the membrane and the substantial retention of the remaining components in the hydrocarbon containing feed stream to form a second membrane stream on the residue side of the membrane, the hydrocarbon containing feed containing at least 20% methane;
   b) withdrawing the second membrane stream for further use;
   c) compressing the first membrane stream;
   d) cooling the compressed first membrane stream using a multi-stream heat exchanger in order to form a compressed, cooled two phase first membrane stream;
   e) separating and purifying the compressed, cooled, two phase first membrane stream in a carbon dioxide separation unit to produce a carbon dioxide rich liquid stream and a carbon dioxide lean vapor stream;
   f) cooling the first membrane stream through heat exchange with the carbon dioxide rich liquid stream at the multi-stream heat exchanger, thereby producing a warmer carbon dioxide rich liquid stream;
   g) recovering the warmer carbon dioxide rich stream from the multi-stream heat exchanger as a high purity carbon dioxide product; and
   h) also cooling the first membrane stream through heat exchange with the Carbon dioxide lean vapor stream at the multi-stream heat exchanger.

2. The process of claim 1, further comprising the step of expanding a portion the carbon dioxide lean vapor stream at an expander.

3. The process of claim 1, wherein the warmer carbon dioxide lean vapor stream is subjected to separation at a second warm membrane separation unit that contains one or more membranes that are selective for carbon dioxide, each of the membranes of the second warm membrane separation unit having a permeate side and a residue side.

4. The process of claim 3, wherein the warmer carbon dioxide lean vapor stream is introduced into the second warm membrane separation unit at a temperature that ranges from about 45° C. to 5° C.

5. The process of claim 3, wherein the warmer carbon dioxide lean vapor stream is introduced into the second warm membrane separation unit at a temperature that ranges from about 10° C. to about 30° C.

6. The process of claim 3, wherein as a result of introducing the carbon dioxide lean vapor stream into the second warm membrane separation unit, a residue stream is formed and a permeate stream is formed, the permeate stream being recycled back to the first membrane stream of the first membrane separation unit and the residue stream from the second warm membrane separation unit is:
   used as a fuel gas.

7. The process of claim 1, further comprising the step of recycling the warmed carbon dioxide lean vapor stream from the multi-stream heat exchanger to the first membrane separation unit where it is added to the hydrocarbon containing feed stream and further processed in the first membrane separation unit.

8. The process of claim 7, further comprising the step of compressing the warmed carbon dioxide lean vapor stream prior to addition to the hydrocarbon containing feed stream.

9. The process of claim 1, wherein the first membrane separation unit is split into two stages in series and the process further comprises the steps of:
   expanding a portion of the carbon dioxide lean vapor stream in an expander;
   warming the expanded carbon dioxide lean vapor stream to provide a warmed carbon dioxide lean stream; and
   using the warmed carbon dioxide lean stream as a permeate sweep for the second stage.

10. The process of claim 1, further comprising the steps of:
   subjecting the carbon dioxide lean vapor stream to treatment in a second cold membrane separation unit to produce a secondary residue stream and a primary permeate stream;
   recycling the secondary residue and primary permeate streams to the multi-stream heat exchanger to provide cooling of the first membrane stream from the first membrane separation unit thereby producing a warmer secondary residue stream and a warmer primary permeate stream;
   recycling the warmer secondary residue stream from the multi-stream heat exchanger to the first membrane separation unit where it is added to the hydrocarbon containing feed stream and further processed in the first membrane separation unit;
   recycling the warmer primary permeate stream from the multi-stream heat exchanger to be:
      added to the first membrane stream of the first membrane separation unit and further processed in the compressor and heat exchanger, or
      utilizing the warmer primary permeate stream as a fuel gas; and
   recovering the warmer carbon dioxide rich stream from the heat exchanger as a high purity carbon dioxide product.

11. The process of claim 10, wherein carbon dioxide lean vapor stream at the second cold membrane separation unit is at a temperature in the range of about 5° C. to about −57° C.

12. The process of claim 10, wherein carbon dioxide lean vapor stream at the second cold membrane separation unit is at a temperature in the range of about −20° C. to about −55° C.

13. The process of claim 10, further comprising the step of compressing the warmer secondary residue stream prior to addition to the hydrocarbon containing feed stream.

14. The process of claim 1, wherein, prior to being injected into the first membrane separation unit, the high pressure hydrocarbon containing feed stream is treated in a dew point chiller, or in a preheater or in both a dew point chiller and preheater.

15. The process of claim 1, wherein the first membrane stream is cooled in the multi-stream heat exchanger to a temperature from about 5° C. to about −57° C.

16. The process of claim 1, wherein the first membrane stream is further cooled in a one pass heat exchanger prior to being cooled in the multi-stream heat exchanger.

17. The process of claim 1, wherein the carbon dioxide separation unit is selected from the group consisting of:
   one or more flash drums operated at gradually decreasing pressures and temperatures;
   one or more flash drums operated at gradually decreasing pressures and temperatures in combination with one or more distillation columns;
   one or more distillation columns; and
   one or more flash drums operated at gradually decreasing pressures and temperatures in combination with a first distillation column to treat bottoms from the flash drums and a second distillation column to remove any helium present in the carbon dioxide lean overhead stream.

18. The process of claim 1, said process comprising a further step of providing additional cooling in the heat exchanger by removing a portion of the carbon dioxide rich liquid stream produced in the carbon dioxide separation unit and passing this portion through an expansion device prior to this expanded carbon dioxide rich liquid stream being recycled through the heat exchanger.

19. The process of claim 1, further comprising the steps of
   upstream of the multi-stream heat exchanger, compressing the first membrane stream; and
   upstream of the multi-stream heat exchanger, cooling the compressed first membrane stream at a one pass heat exchanger with the second membrane stream.

20. The process of claim 1, wherein the high pressure hydrocarbon containing feed stream is introduced into the membrane separation unit at a temperature that ranges from about −45° C. to about 50° C.

21. The process of claim 1, further comprising the steps of:
   expanding a portion the carbon dioxide lean vapor stream at an expander;
   recycling the expanded carbon dioxide lean vapor stream to the multi-stream heat exchanger to provide additional cooling of the first membrane stream; and
   recycling a remaining portion of the carbon dioxide lean vapor stream to the multi-stream heat exchanger where the carbon dioxide lean vapor stream is used to provide cooling of the first membrane stream thereby producing a warmer carbon dioxide lean vapor stream.

* * * * *